(12) United States Patent
Hayasaka

(10) Patent No.: US 6,922,035 B2
(45) Date of Patent: Jul. 26, 2005

(54) FORCE-APPLYING INPUT DEVICE

(75) Inventor: Satoshi Hayasaka, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 10/779,888

(22) Filed: Feb. 17, 2004

(65) Prior Publication Data

US 2004/0164700 A1 Aug. 26, 2004

(30) Foreign Application Priority Data

Feb. 20, 2003 (JP) .......................... 2003-042768

(51) Int. Cl.$^7$ .............................................. G06F 3/33
(52) U.S. Cl. .................. 318/652; 318/638; 318/632; 318/568.22; 715/701
(58) Field of Search .................. 318/652, 638, 318/632, 568.22; 715/701

(56) References Cited

U.S. PATENT DOCUMENTS

| | | | | |
|---|---|---|---|---|
| 4,418,774 A | * | 12/1983 | Whitney et al. | 177/210 FP |
| 4,510,574 A | * | 4/1985 | Guittet et al. | 700/260 |
| 4,988,981 A | * | 1/1991 | Zimmerman et al. | 345/158 |
| 5,710,498 A | * | 1/1998 | Yutkowitz et al. | 318/632 |
| 5,739,811 A | * | 4/1998 | Rosenberg et al. | 345/161 |
| 5,825,308 A | * | 10/1998 | Rosenberg | 341/20 |
| 5,889,670 A | * | 3/1999 | Schuler et al. | 700/83 |
| 6,219,032 B1 | * | 4/2001 | Rosenberg et al. | 345/157 |

* cited by examiner

Primary Examiner—Rita Leykin
(74) Attorney, Agent, or Firm—Brinks Hofer Gilson & Lione

(57) ABSTRACT

A force-applying input device has a controller which calculates a torque component of an actuator drive signal corresponding to a current position by multiplying the sum of the current position and the product of a current speed and a coefficient by an elastic modulus. In addition, the controller also calculates a torque component of the actuator drive signal corresponding to the current speed by multiplying the current speed by a coefficient of viscous friction.

3 Claims, 5 Drawing Sheets

FORCE-APPLYING INPUT DEVICE

This application claims the benefit of priority to Japanese Patent Application No. 2003-042768, herein incorporated by reference.

BACKGROUND OF THE INVENTION

1. Field of the Invention

The present invention relates to an input device which applies an electrically controlled force to a manually operated operating unit, and more specifically relates to a technique for optimizing the time at which the force is applied to the operating unit without being affected by the operating speed of the operating unit.

2. Description of the Related Art

Recently, force-applying bi-wire input devices (hereinafter called "force-applying input devices" in the present specification) in which the operational state of an operating unit is converted into an electrical signal and transmitted to a controlled object and an actuator, such as an electric motor, is controlled so as to apply a suitable force to the operating unit have been proposed and have been used in various applications in place of mechanical input devices in which the operational state of the operating unit is transmitted to the controlled object via a mechanical system. There are several types of force-applying input devices: a slide type and a lever type in which the operating unit can be reciprocated in only one direction, a rotary type in which the operating unit can be rotated around only one axis, a joystick type in which the operating unit can be operated in any direction, etc.

In the case in which the force-applying input device is set such that a predetermined force is applied to the operating unit if the operating unit is at a predetermined position, the time at which the force is applied to the operating unit is controlled as a function of the position of the operating unit. For example, the force-applying input device may be provided with a display which shows one or more symbols and a cursor whose movement is controlled by the operating unit, and a force which pulls the cursor toward the central point of one of the symbols may be applied to the operating unit when the cursor is moved into a region within a predetermined distance from the central point of the symbol. In such a case, the displacement and the moving direction of the operating unit are determined using a position sensor, such as an encoder, and a predetermined actuator drive signal is output from a controller when a position signal output from the position sensor represents a position within a predetermined distance from the central point of the symbol. Accordingly, an external force which pulls the cursor toward the central point of the symbol is applied to the operating unit.

In order to ensure the operational stability of the operating unit, the actuator may be controlled in accordance not only with the position signal output from the position sensor but also with the operating speed of the operating unit which is calculated on the basis of the position signal. In that case, the actuator is controlled such that the resistive force applied to the operating unit increases as the calculated operating speed increases.

However, when the time at which the force is applied to the operating unit is controlled as a function of the position of the operating unit, the controller must first calculate the position of the operating unit on the basis of the position signal output from the position sensor, and then calculate the actuator drive signal corresponding to the calculated position of the operating unit and activate the actuator. Therefore, there is a time lag between when the position and the moving direction of the operating unit are calculated and when the force is actually applied to the operating unit. Accordingly, the force cannot be stably controlled and there is a problem in that the operating unit vibrates at the central point of the symbol when the operating unit is not held by the operator. This problem becomes more severe as the operating speed of the operating unit increases.

SUMMARY OF THE INVENTION

Embodiments of the present invention provide a force-applying input device in which the force is applied to the operating unit at a suitable time in accordance with the operation of the operating unit and which can perform stable force control.

A force-applying input device according to one embodiment of the present invention includes an operating unit; a position sensor which detects the operational state of the operating unit and outputs a position signal; an actuator which applies an external force to the operating unit; and a controller which outputs an actuator drive signal on the basis of the position signal to control the actuator. The controller calculates a current position and a current speed of the operating unit on the basis of the position signal and determines a first component of the actuator drive signal, the first component corresponding to the current position, by multiplying the sum of the current position and the product of the current speed and a coefficient by an elastic modulus.

As described above, the actuator drive signal is not calculated simply by multiplying the current position of the operating unit by the elastic modulus, and the component of the actuator drive signal corresponding to the calculated current position (elastic force) is determined by multiplying the sum of the current position of the operating unit and the product of the current speed of the operating unit and the coefficient by the elastic modulus. Therefore, the actuator drive signal can be calculated earlier than the time when the actual current position is calculated, by the amount corresponding to the product of the current speed of the operating unit and the coefficient, and accordingly the actuator can be driven earlier. As a result, the force can be applied to the operating unit at a suitable time in accordance with the movement of the operating unit to a predetermined position and stable force control can be performed.

The controller included in the force-applying input device according to another embodiment of the present invention calculates the actuator drive signal by adding the first component of the actuator drive signal and a second component of the actuator drive signal, the second component corresponding to the current speed and being determined by multiplying the current speed by a coefficient of viscous friction.

In this case, the actuator drive signal is calculated by adding the component corresponding to the calculated current position (elastic force) and the component corresponding to the calculated current speed (frictional force). Therefore, the resistive force applied to the operating unit increases along with the operating speed of the operating unit. Accordingly, the operational stability of the operating unit can be increased and the operating feel of the force-applying input device can be improved.

A force-applying input device according to yet another embodiment of the present invention includes an operating unit; a position sensor which detects the operational state of the operating unit and outputs a position signal; an actuator which applies an external force to the operating unit; and a controller which outputs an actuator drive signal on the basis of the position signal to control the actuator. The controller calculates a current position and a current speed of the operating unit on the basis of the position signal, determines a first component of the actuator drive signal, the first component corresponding to the current position, by multiplying the current position by an elastic modulus and a second component of the actuator drive signal, the second component corresponding to the current speed, by multiplying the sum of a coefficient of viscous friction and the product of the elastic modulus and a coefficient by the current speed, and calculates the actuator drive signal by adding the first component and the second component of the actuator drive signal.

In this case, the component of the actuator drive signal corresponding to the calculated current speed (frictional force) is calculated by multiplying the sum of the coefficient of viscous friction and the product of the elastic modulus and the coefficient by the calculated current speed. Since the viscous friction increases at regions where the elastic modulus is large and stable force control is difficult, the operating feel of the operating unit is not adversely affected and stability of the force control can be increased.

As described above, according to the present invention, the actuator drive signal is not calculated simply as a function of the current position of the operating unit, but is calculated as a function of both the current position and the current speed of the operating unit. Therefore, the actuator drive signal can be calculated earlier than the time when the actual current position is calculated, by the amount corresponding to the current speed of the operating unit, and accordingly the actuator can be driven earlier. As a result, the force can be applied to the operating unit at a suitable time in accordance with the movement of the operating unit to a predetermined position and stable force control can be performed by the force-applying input device.

DESCRIPTION OF THE PREFERRED EMBODIMENT

Figure 1:
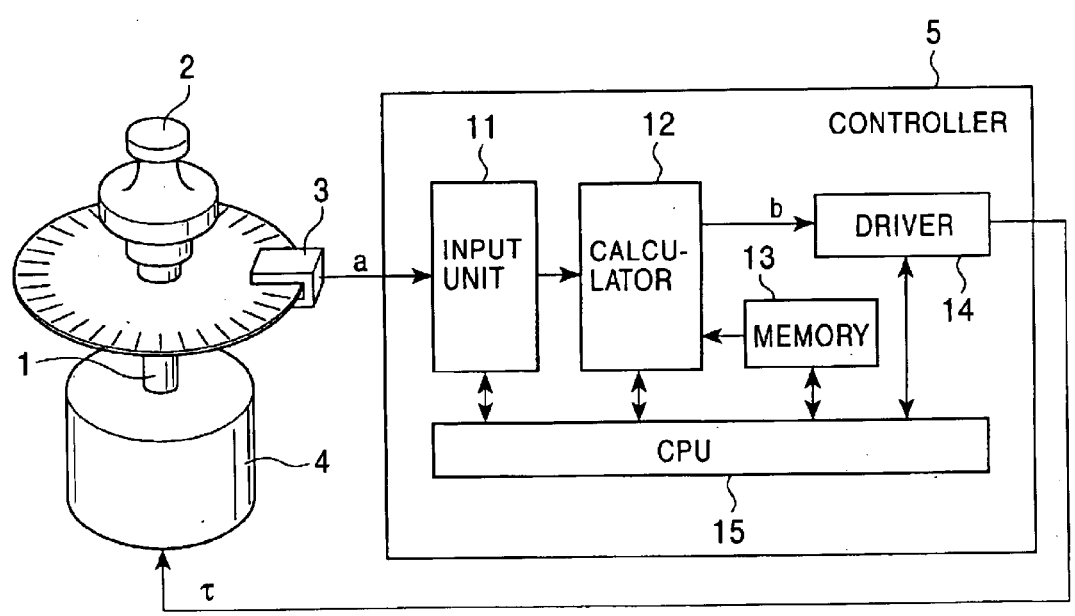
FIG. 1 is a diagram showing the construction of a force-applying input device according to a first embodiment of the present invention.
Figure 2:
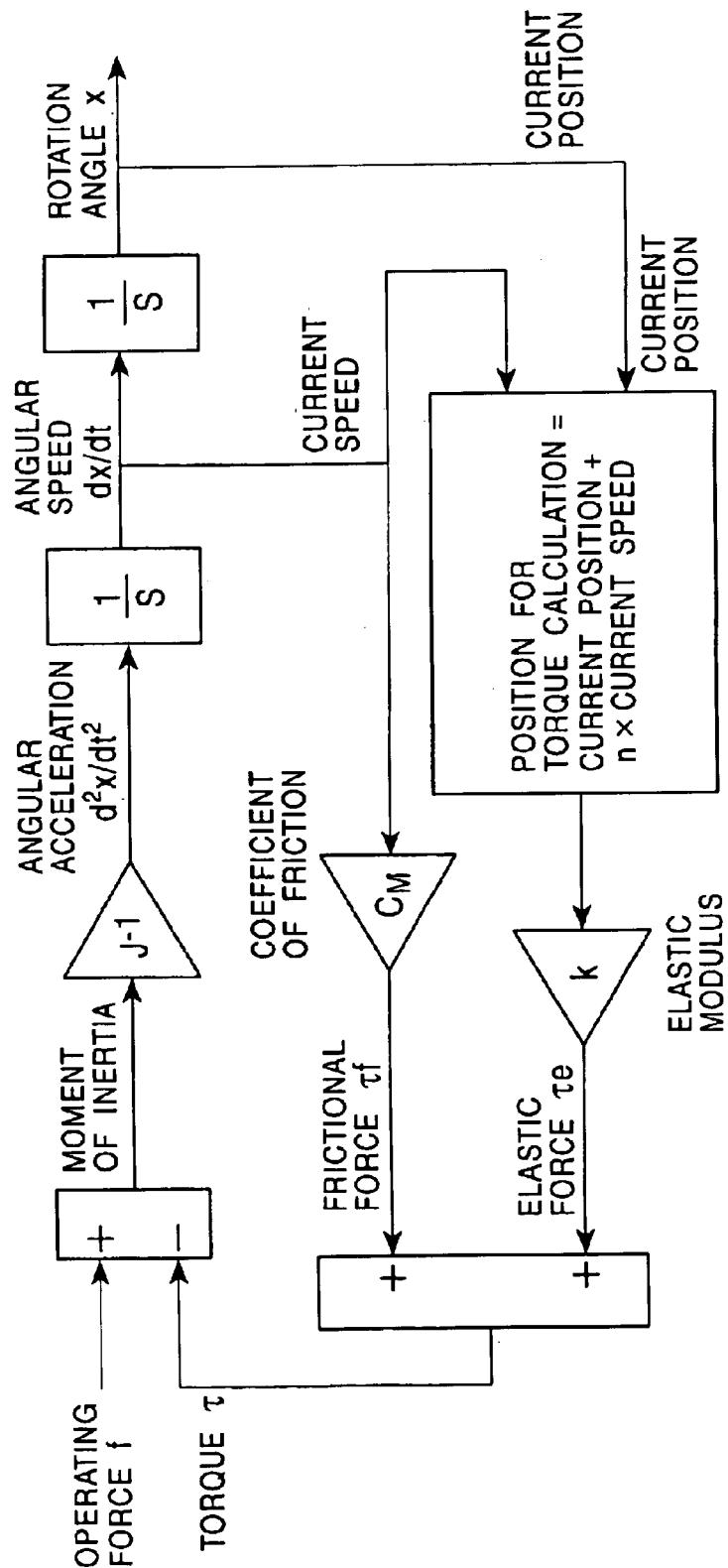
FIG. 2 is a control block diagram of the force-applying input device according to the first embodiment.
Figure 3:
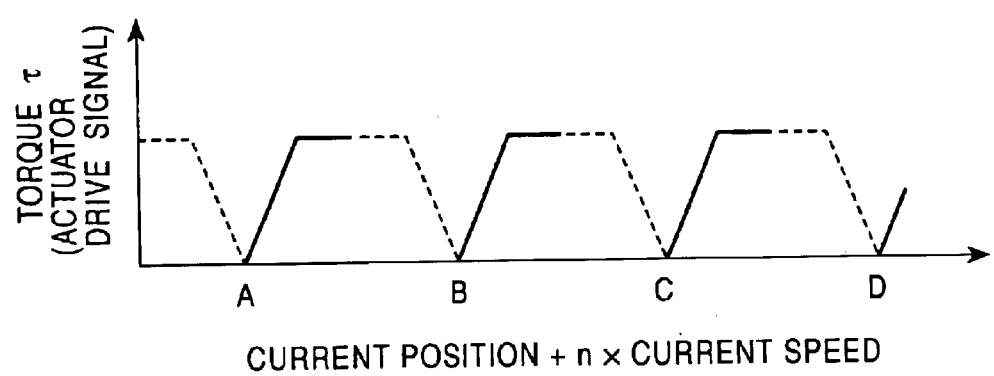
FIG. 3 is a graph showing a torque pattern stored in a controller of the force-applying input device according to the first embodiment.
Figure 4:
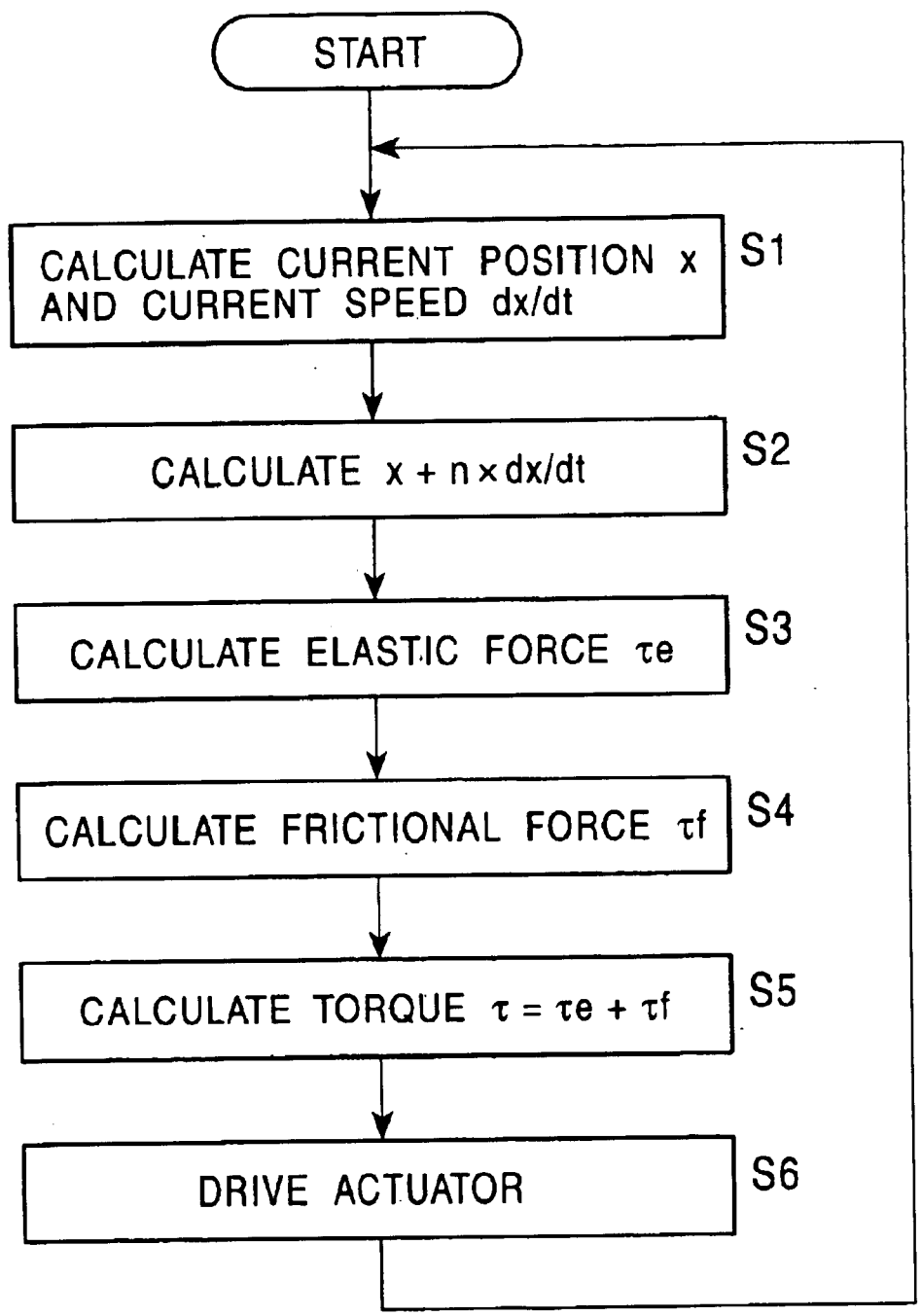
FIG. 4 is a flowchart of an operation performed by the force-applying input device according to the first embodiment.

A force-applying input device according to a first embodiment of the present invention will be described below with reference to FIGS. 1 to 4. FIG. 1 is a diagram showing the construction of the force-applying input device according to the first embodiment of the present invention, FIG. 2 is a control block diagram of the force-applying input device according to the first embodiment, FIG. 3 is a graph showing a torque pattern stored in a controller of the force-applying input device according to the first embodiment, and FIG. 4 is a flowchart of an operation performed by the force-applying input device according to the first embodiment.

As shown in FIG. 1, the force-applying input device according to the first embodiment includes a rotating shaft 1, an operating unit 2 which is attached to the rotating shaft 1 at the top end thereof, a position sensor 3 which detects the rotating direction and the amount of rotation of the rotating shaft 1, an actuator 4 which applies a force to the operating unit 2 via the rotating shaft 1, and a controller 5 which receives a position signal a output from the position sensor 3 and generates a drive signal b for the actuator 4.

The shape and the size of the operating unit 2 are suitably determined such that the operating unit 2 can be operated by an operator.

The position sensor 3 detects the rotating direction and the amount of rotation of the rotating shaft 1, converts them to electrical signals, and outputs the electric signals. A rotary encoder or a rotary variable resistor, for example, may be used as the position sensor 3.

The actuator 4 applies a torque to the rotating shaft 1 as an external force, and an electric power source such as a motor and a solenoid may be used as the actuator 4. When a linear device such as a linear motor or a solenoid is used as the actuator 4, a suitable power-transmission mechanism is provided between the rotating shaft 1 and the actuator 4 for converting the linear movement of the actuator 4 into the rotational movement of the rotating shaft 1.

As shown in FIG. 1, the controller 5 includes an input unit 11 which receives the position signal a output from the position sensor 3, a calculator 12 which calculates the actuator drive signal b used for applying a suitable force to the operating unit 2 on the basis of the position signal a, a memory 13 which stores functions and coefficients used for the calculation, a torque pattern, a process flow for the calculation, etc., a driver circuit 14 which outputs a drive power c corresponding to the actuator drive signal b output from the calculator 12 to drive the actuator 4, and a central processing unit (CPU) 15 which controls each of the components 11 to 14. As shown in FIG. 3, the torque pattern used in the present embodiment is for pulling a cursor toward central points A, B, C, and D of symbols shown on a display. In the figure, the broken lines show a thrust applied to the operating unit 2 and the solid lines show a reaction force applied to the operating unit 2. Each of the thrust and the reaction force is obtained as a function of the sum of a current position x of the operating unit 2 and the product of a current speed dx/dt of the operating unit 2 and a coefficient n.

The CPU 15 calculates the drive signal for the actuator 4 and applies a force to the operating unit 2 in accordance with the operational flow shown in FIG. 4, which is stored in the memory 13. More specifically, when the operating unit 2 is operated by the operator, the current position x and the current speed dx/dt of the operating unit 2 are calculated on the basis of the position signal a output from the position sensor 3 in Step 1. Then, in Step 2, the calculated current position x is added to the product of the calculated current speed dx/dt and the coefficient n, and a current position x+n·dx/dt used for calculating the actuator drive signal is thus obtained. Next, in Step 3, a torque component τe corresponding to the calculated current position x+n·dx/dt is determined from the torque pattern shown in FIG. 3. In addition, in Step 4, a torque component τf corresponding to the current speed dx/dt is calculated by multiplying the current speed dx/dt of the operating unit 2 obtained in Step 1 by a coefficient of viscous friction. Next, in Step 5, a torque τ to be applied to the operating unit 2 by the actuator 4 is calculated by adding the torque component τe and the torque component τf. Lastly, in Step 6, the actuator drive signal corresponding to the torque τ is output from the calculator 12 to the driver circuit 14, and the actuator 4 is driven such that the force is applied to the operating unit 2. Accordingly, the control block shown in FIG. 2 is performed.

According to the force-applying input device of the present embodiment, the actuator drive signal is not calculated simply as a function of the calculated current position x of the operating unit 2, but the component of the actuator drive signal corresponding to the calculated current position (elastic force) is calculated as a function of the sum of the calculated current position x of the operating unit 2 and the product of the calculated current speed dx/dt of the operating unit 2 and the coefficient n. Therefore, the actuator drive signal τ can be calculated earlier than the time when the actual current position is calculated, by the amount proportional to the product n·dx/dt of the calculated current speed of the operating unit 2 and the coefficient, and accordingly the actuator 4 can be driven earlier. As a result, the force can be applied to the operating unit 2 at a suitable time in accordance with the movement of the operating unit 2 to a predetermined position, and stable force control can be performed. In addition, since the actuator drive signal τ is calculated by adding the torque component τe corresponding to the calculated current position x and the torque component τf corresponding to the calculated current speed dx/dt, the resistive force applied to the operating unit 2 increases along with the operating speed of the operating unit 2. Accordingly, the operational stability of the operating unit 2 can be increased and the operating feel of the force-applying input device can be improved.

Figure 5:
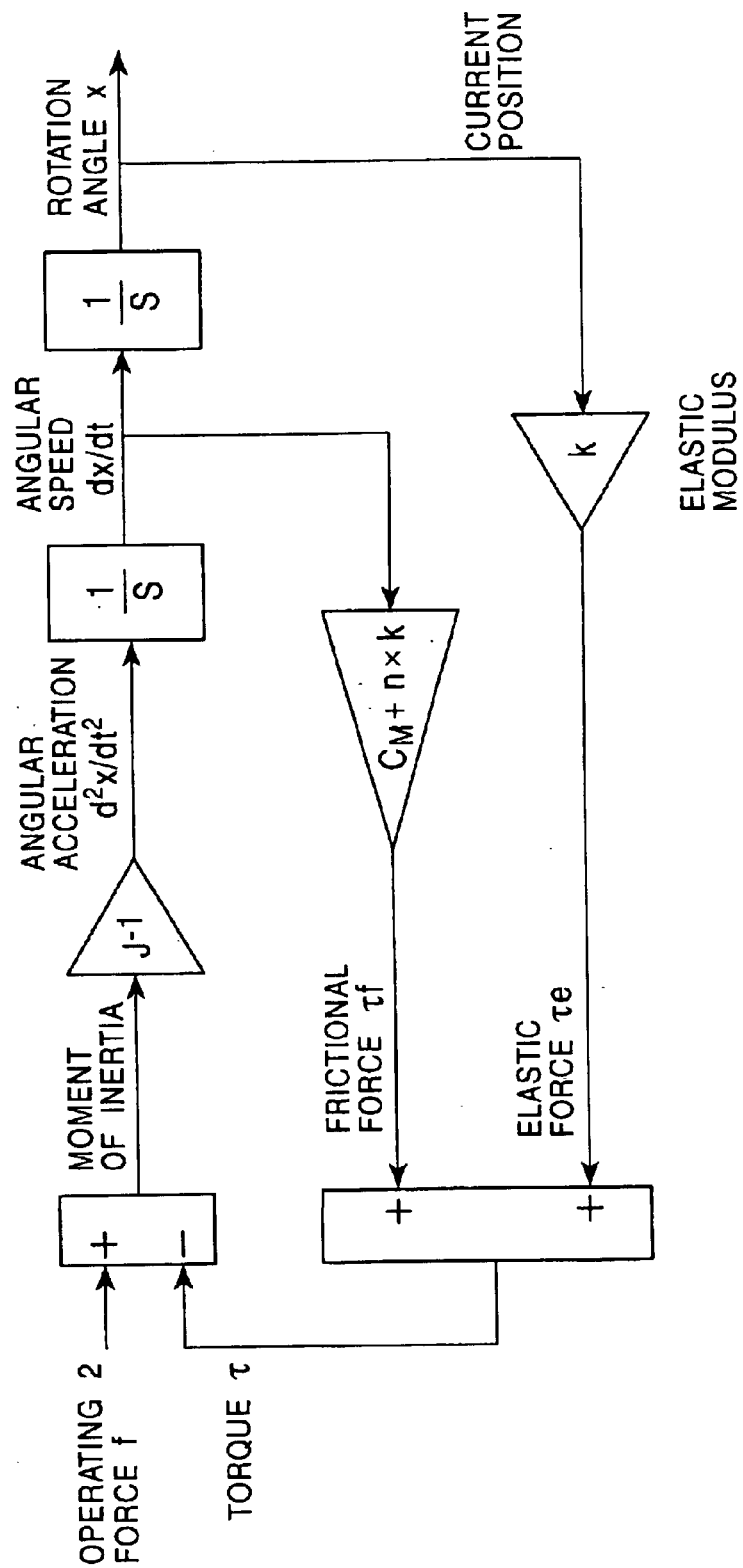
FIG. 5 is a control block diagram of a force-applying input device according to a second embodiment of the present invention.

Next, a force-applying input device according to a second embodiment of the present invention will be described below with reference to FIG. 5. FIG. 5 is a control block diagram of the force-applying input device according to the second embodiment.

As shown in FIG. 5, in the force-applying input device according to the second embodiment, the torque component τe of the actuator drive signal corresponding to the calculated current position x is determined by multiplying the calculated current position x by an elastic modulus k and the torque component τf of the actuator drive signal corresponding to the calculated current speed is determined by multiplying the sum of the coefficient Cm of viscous friction and the product of the elastic modulus k and the coefficient n by the calculated current speed dx/dt. Then, the actuator drive signal τ is calculated by adding the torque components τe and τf. Other constructions of the second embodiment are similar to those of the force-applying input device according to the first embodiment, and explanations thereof are thus omitted.

The force-applying input device according to the second embodiment provides effects similar to those obtained by the force-applying input device according to the first embodiment. More specifically, since the viscous friction increases at regions where the elastic modulus is large and stable force control is difficult, the operating feel of the operating unit is not adversely affected and stability of the force control can be greatly increased.

In the above-described embodiments, a force-applying input device of the rotary type is described as an example. However, the present invention may also be applied to slide-type and lever-type force-applying input devices and joystick-type force-applying input devices.

What is claimed is:

1. A force-applying input device comprising:
   an operating unit;
   a position sensor which detects an operational state of the operating unit and outputs a position signal;
   an actuator which applies an external force to the operating unit; and
   a controller which outputs an actuator drive signal on the basis of the position signal to control the actuator,
   wherein the controller calculates a current position and a current speed of the operating unit on the basis of the position signal and determines a first component of the actuator drive signal, the first component corresponding to the current position, by multiplying a sum of the current position and a product of the current speed and a coefficient by an elastic modulus.

2. A force-applying input device according to claim 1, wherein the controller calculates the actuator drive signal by adding the first component of the actuator drive signal and a second component of the actuator drive signal, the second component corresponding to the current speed and being determined by multiplying the current speed by a coefficient of viscous friction.

3. A force-applying input device comprising:
   an operating unit;
   a position sensor which detects an operational state of the operating unit and outputs a position signal;
   an actuator which applies an external force to the operating unit; and
   a controller which outputs an actuator drive signal on the basis of the position signal to control the actuator,
   wherein the controller calculates a current position and a current speed of the operating unit on the basis of the position signal, determines a first component of the actuator drive signal, the first component corresponding to the current position, by multiplying the current position by an elastic modulus and a second component of the actuator drive signal, the second component corresponding to the current speed, by multiplying a sum of a coefficient of viscous friction and a product of the elastic modulus and a coefficient by the current speed, and calculates the actuator drive signal by adding the first component and the second component of the actuator drive signal.

* * * * *